(12) United States Patent
Zhang

(10) Patent No.: US 10,827,553 B2
(45) Date of Patent: Nov. 3, 2020

(54) METHOD AND APPARATUS FOR SESSION REESTABLISHMENT, ACCESS AND MOBILITY MANAGEMENT FUNCTION ENTITY, SESSION MANAGEMENT FUNCTION ENTITY AND TERMINAL

(71) Applicant: CHINA ACADEMY OF TELECOMMUNICATIONS TECHNOLOGY, Beijing (CN)

(72) Inventor: Juan Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/495,032

(22) PCT Filed: Feb. 14, 2018

(86) PCT No.: PCT/CN2018/076821
§ 371 (c)(1),
(2) Date: Sep. 17, 2019

(87) PCT Pub. No.: WO2018/166329
PCT Pub. Date: Sep. 20, 2018

(65) Prior Publication Data
US 2020/0275510 A1    Aug. 27, 2020

(30) Foreign Application Priority Data
Mar. 17, 2017 (CN) .......................... 2017 1 0159751

(51) Int. Cl.
*H04W 76/19*    (2018.01)
*H04W 76/11*    (2018.01)
(Continued)

(52) U.S. Cl.
CPC ............ *H04W 76/19* (2018.02); *H04W 76/11* (2018.02); *H04W 92/045* (2013.01); *H04W 92/10* (2013.01); *H04W 92/16* (2013.01)

(58) Field of Classification Search
None
See application file for complete search history.

(56) References Cited

U.S. PATENT DOCUMENTS

2016/0037411 A1    2/2016  Franklin et al.
2018/0192390 A1*   7/2018  Li .......................... H04W 4/60
(Continued)

FOREIGN PATENT DOCUMENTS

CN    104869660 A    8/2015
EP      3479623 A1   1/2018
(Continued)

OTHER PUBLICATIONS

Written Opinion of the International Searching Authority and International Search Report, PCT/CN2018/076821, Form PCT/ISA/237(Box No. V) (Jul. 2009).
(Continued)

*Primary Examiner* — Eunsook Choi
(74) *Attorney, Agent, or Firm* — Flener IP & Business Law; Zareefa B. Flener; Ayhan E. Mertogul

(57) ABSTRACT

A method and an apparatus for session reestablishment, an Access and Mobility Management Function entity AMF, a Session Management Function entity SMF and a terminal are provided. The method includes: AMF obtaining a Non-Access Stratum NAS message transmitted by a terminal, where the NAS message is to request to establish a new packet data unit PDU session connected to a same data network as an initial PDU session, and the NAS message carries first identification information of the initial PDU session and second identification information of the new (Continued)

PDU session assigned by the terminal; and transmitting a session management request to SMF corresponding to the first identification information. The session management request carries the first identification information and the second identification information, and the session management request is to cause the SMF to establish the new PDU session based on the first identification information and the second identification information.

20 Claims, 6 Drawing Sheets

(51) Int. Cl.
    *H04W 92/16* (2009.01)
    *H04W 92/04* (2009.01)
    *H04W 92/10* (2009.01)

(56) References Cited

U.S. PATENT DOCUMENTS

| | | | |
|---|---|---|---|
| 2018/0234876 A1* | 8/2018 | Jheng | H04L 67/146 |
| 2019/0007500 A1* | 1/2019 | Kim | H04L 67/141 |
| 2019/0150219 A1* | 5/2019 | Wang | H04W 76/30 |
| | | | 370/329 |
| 2020/0120570 A1* | 4/2020 | Youn | H04W 36/0033 |
| 2020/0128430 A1* | 4/2020 | Yi | H04W 28/0268 |
| 2020/0137672 A1* | 4/2020 | Rommer | H04W 76/12 |
| 2020/0145953 A1* | 5/2020 | Youn | H04W 36/0027 |

FOREIGN PATENT DOCUMENTS

| | | |
|---|---|---|
| EP | 3508004 A1 | 7/2018 |
| KR | 20160014382 A | 2/2016 |
| WO | 2015123948 A1 | 8/2015 |
| WO | 2018006017 A1 | 1/2018 |
| WO | 2018127190 A1 | 7/2018 |

OTHER PUBLICATIONS

SA WG2 Meeting #119 S2-171456, Feb. 13-17, 2017, Dubrovnik, Croatia, Source: CATT, Title: Update PDU session establishment, Document for: Approval, Agenda Item: 6.5.3, Work Item / Release: 5GS_Ph1/ Rel15.

First Office Action, The State Intellectual Property Office of People's Republic of China, 20170159751.1, Institute of Telecommunications Science and Technology, Session Reestablishment Method, Device, AMF, SMF and Terminal.

3GPP TSG SA WG2 Meeting #120 S2-172137, Mar. 27-31, 2017, Busan, Korea, Source: CATT, Title: Update PDU session anchor relocation for SSC mode 3 with multiple PDU sessions, Document for: Approval, Agenda Item: 6.5.3, Work Item / Release: 5GS_ph1 / Rel-15.

SA WG2 Meeting #119 S2-171540, Feb. 13-17, 2017 Dubrovnik, Croatia, Source: Orange, Intel, Samsung, Title: Network-triggered UPF relocation for SSC mode 3 with multiple PDU sessions, Document for: Approval, Agenda Item: 6.5.3, Work Item / Release: 5G_ph1 / Rel-15.

Extended European Search Report, Application No. PCT/CN2018076821, dated Feb. 11, 2020 China Academy of Telecommunications Academy.

SA WG2 Meeting #119, S2-171047, Feb. 13-17, 2017,Dubrovnik, Croatia, Agenda Item: 6.5.3, Source: CATT, Title: Update PDU Session Establishment, Document For: Approval.

* cited by examiner transmitting a NAS message to an AMF in accordance with a notification message about PDU session reestablishment transmitted by an SMF, where the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, where the session management request is configured to cause the SMF to establish the new PDU session in accordance with the first identification information and the second identification information

METHOD AND APPARATUS FOR SESSION REESTABLISHMENT, ACCESS AND MOBILITY MANAGEMENT FUNCTION ENTITY, SESSION MANAGEMENT FUNCTION ENTITY AND TERMINAL

CROSS-REFERENCE TO RELATED APPLICATION

The present application is the U.S. national phase of PCT Application No. PCT/CN2018/076821 filed on Feb. 14, 2018, which claims a priority of the Chinese patent application No. 201710159751.1 filed in China on Mar. 17, 2017, disclosures of which are incorporated herein by reference in their entireties.

TECHNICAL FIELD

The present disclosure relates to the field of communication applications, in particular to a method and an apparatus for session reestablishment, an Access and Mobility Management Function entity (AMF), a Session Management Function entity (SMF) and a terminal.

BACKGROUND

There is a demand for packet data unit (PDU) session to support multiple types of continuities in Next Gen systems. To meet the demand, the latest Technical Report (TR) defines three service and session continuity (SSC) modes.

In SSC mode 1, a PDU session is assigned with one anchor User Plane Function (UPF) and the UPF remains unchanged throughout the entire lifetime of the PDU session.

In SSC mode 2, the UPF assigned to a PDU session may be valid only in a specific service area, and if a User Equipment (UE) moves out of the service area of the UPF, the UE must select a new UPF.

In SSC mode 3, after a UPF is selected and a PDU session to a data network is established, and before the connection from the UE to the UPF is aborted, a new PDU session to the same data network is established additionally, and a new UPF is selected for the new PDU session. The UE may transfer the data flow to the new PDU session and delete the previously established PDU session connection.

For PDU sessions in the SSC mode 3, if the current PDU session path is not optimal or the current PDU session will not be maintained, the network may inform the UE to establish a new PDU session to the same data network. A same Session Management Function entity (SMF) should be selected for both the new PDU session and the old PDU session. At present, the Access and Mobility Management Function entity (AMF) is responsible for selecting the SMF for the PDU sessions. However, the existing mechanism may not ensure that the AMF selects a same SMF for two SSC-mode-3 PDU sessions to the same data network.

SUMMARY

In order to solve the problem that the existing mechanism can not ensure that the AMF selects a same SMF for two PDU sessions to the same data network, the present disclosure provides a method and an apparatus for session reestablishment, an AMF, an SMF and a terminal.

To achieve the foregoing objective, embodiments of the present disclosure provide a method for session reestablishment, applied to an AMF, and including: obtaining a Non-Access Stratum NAS message transmitted by a terminal, wherein the NAS message is used to request to establish a new packet data unit PDU session connected to a same data network as an initial PDU session, and the NAS message carries first identification information of the initial PDU session and second identification information of the new PDU session assigned by the terminal; and transmitting a session management request to a Session Management Function entity SMF corresponding to the first identification information, wherein the session management request carries the first identification information and the second identification information, and the session management request is configured to cause the SMF to establish the new PDU session in accordance with the first identification information and the second identification information.

Optionally, the transmitting the session management request to the SMF corresponding to the first identification information includes: parsing the NAS message to obtain the first identification information; obtaining SMF identification information corresponding to the first identification information in accordance with a pre-stored correspondence between PDU session identification information and the SMF identification information; and transmitting the session management request to the SMF corresponding to the SMF identification information.

Optionally, the NAS message is a PDU session establishment request, the PDU session identification information of the PDU session establishment request carries the first identification information and N1 session management message of the PDU session establishment request carries the second identification information; and the parsing the NAS message to obtain the first identification information includes: parsing the PDU session identification information of the PDU session establishment request to obtain the first identification information.

Optionally, the NAS message is a PDU session reestablishment request, and the PDU session identification information of the PDU session reestablishment request carries the first identification information and the second identification information; and the parsing the NAS message to obtain the first identification information includes: parsing the PDU session identification information of the PDU session reestablishment request to obtain the first identification information and the second identification information.

Optionally, the method for session reestablishment further includes: obtaining the second identification information and SMF identification information transmitted by the SMF, and storing the second identification information and the SMF identification information in accordance with a correspondence between the second identification information and the SMF identification information.

To achieve foregoing objective, embodiments of the present disclosure further provide an apparatus for session reestablishment, applied to the AMF, and including: a first obtaining module, configured to obtain a NAS message transmitted by a terminal, wherein the NAS message is used to request to establish a new PDU session connected to a same data network as an initial PDU session, and the NAS message carries first identification information of the initial PDU session and second identification information assigned by the terminal to the new PDU session; and a first transmission module, configured to transmit a session management request to an SMF corresponding to the first identification information, wherein the session management request carries the first identification information and the second identification information and is configured to cause the SMF to establish the new PDU session in accordance with the first identification information and the second identification information.

Optionally, the first transmission module includes: a parsing sub-module, configured to parse the NAS message to obtain the first identification information; an obtaining sub-module, configured to obtain SMF identification information corresponding to the first identification information in accordance with a pre-stored correspondence between PDU session identification information and the SMF identification information; and a transmission sub-module, configured to transmit the session management request to the SMF corresponding to the SMF identification information.

Optionally, the NAS message is a PDU session establishment request, the PDU session identification information of the PDU session establishment request carries the first identification information and N1 session management message of the PDU session establishment request carries the second identification information; and the parsing sub-module is configured to parse the PDU session identification information of the PDU session establishment request to obtain the first identification information.

Optionally, the NAS message is a PDU session reestablishment request, and the PDU session identification information of the PDU session reestablishment request carries the first identification information and the second identification information; and the parsing sub-module is configured to parse the PDU session identification information of the PDU session reestablishment request to obtain the first identification information and the second identification information.

Optionally, the apparatus for session reestablishment further includes: a second obtaining module, configured to obtain the second identification information and SMF identification information transmitted by the SMF, and store the second identification information and the SMF identification information in accordance with a correspondence between the second identification information and the SMF identification information.

To achieve foregoing objective, embodiments of the present disclosure further provide an Access and Mobility Management Function, including a first storage, a first processor and a computer program that is stored on the first storage and executable by the first processor, wherein the first processor is configured to execute the computer program to implement steps of the method for session reestablishment as described above.

To achieve foregoing objective, embodiments of the present disclosure further provide a method for session reestablishment, applied to an SMF, and including: transmitting a notification message about PDU session reestablishment to a terminal; obtaining a session management request transmitted by an AMF, wherein the session management request is transmitted by the AMF after a NAS message transmitted by the terminal in response to the notification message is received by the AMF, both the NAS message and the session management request carry first identification information of an initial PDU session and second identification information of a new PDU session, the SMF corresponds to the first identification information, and the initial PDU session and the new PDU session are connected to a same data network; and establishing the new PDU session in accordance with the first identification information and the second identification information.

Optionally, the establishing the new PDU session in accordance with the first identification information and the second identification information includes: selecting a new UPF for the new PDU session in accordance with the first identification information and the second identification information; and establishing an N4 interface connection to the new UPF and establishing air interface and N3 User Plane connections for the new UPF.

Optionally, subsequent to the establishing the new PDU session in accordance with the first identification information and the second identification information, the method further includes: establishing a correspondence between the second identification information and SMF identification information, and transmitting the second identification information and the SMF identification information to the AMF.

To achieve foregoing objective, embodiments of the present disclosure further provide an apparatus for session reestablishment, applied to an SMF, and including: a second transmission module, configured to transmit a notification message about PDU session reestablishment to a terminal; a third obtaining module, configured to obtain a session management request transmitted by an AMF, wherein the session management request is transmitted by the AMF after a NAS message transmitted by the terminal in response to the notification message is received by the AMF, both the NAS message and the session management request carry first identification information of an initial PDU session and second identification information of a new PDU session, the SMF corresponds to the first identification information, and the initial PDU session and the new PDU session are connected to a same data network; and an establishment module, configured to establish the new PDU session in accordance with the first identification information and the second identification information.

Optionally, the establishment module includes: a selection sub-module, configured to select a new UPF for the new PDU session in accordance with the first identification information and the second identification information; and an establishment sub-module, configured to establish an N4 interface connection to the new UPF and establish air interface and N3 User Plane connections for the new UPF.

Optionally, the apparatus for session reestablishment further includes: a third transmission module, configured to establish a correspondence between the second identification information and SMF identification information, and transmit the second identification information and the SMF identification information to the AMF.

To achieve foregoing objective, embodiments of the present disclosure further provide a Session Management Function, including a second storage, a second processor and a computer program stored on the second storage and configured to be executed by the second processor, wherein the second processor is configured to execute the computer program to implement steps performed by the SMF according to the method for session reestablishment.

To achieve foregoing objective, embodiments of the present disclosure further provide a method for session reestablishment, applied to a terminal, and including: transmitting a NAS message to an AMF in accordance with a notification message about PDU session reestablishment transmitted by an SMF, wherein the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, wherein the session management request is configured to cause the SMF to establish the new PDU session in accordance with the first identification information and the second identification information.

Optionally, the transmitting the NAS message to the AMF includes: adding the first identification information into PDU session identification information of a PDU session establishment request, adding the second identification information into N1 session management message of the PDU session establishment request and transmitting the PDU session establishment request to the AMF.

To achieve foregoing objective, embodiments of the present disclosure further provide an apparatus for session reestablishment, applied to a terminal, and including: a fourth transmission module, configured to transmit a NAS message to an AMF in accordance with a notification message about PDU session reestablishment transmitted by an SMF, wherein the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, wherein the session management request is configured to cause the SMF to establish the new PDU session in accordance with the first identification information and the second identification information.

Optionally, the fourth transmission module is configured to add the first identification information into PDU session identification information of a PDU session establishment request, add the second identification information into N1 session management message of the PDU session establishment request and transmit the PDU session establishment request to the AMF.

To achieve foregoing objective, embodiments of the present disclosure further provide a terminal, including a third storage, a third processor and a computer program stored on the third storage and configured to be executed by the third processor, wherein the third processor is configured to execute the computer program to implement steps performed by the terminal according to the method for session reestablishment.

To achieve foregoing objective, embodiments of the present disclosure further provide a computer-readable storage medium storing therein a computer program, wherein the computer program is configured to be executed by a processor, to implement steps performed by the AMF according to the method for session reestablishment.

To achieve foregoing objective, embodiments of the present disclosure further provide a computer-readable storage medium storing therein a computer program, wherein the computer program is configured to be executed by a processor, to implement steps performed by the SMF according to the method for session reestablishment.

To achieve foregoing objective, embodiments of the present disclosure further provide a computer-readable storage medium storing therein a computer program, wherein the computer program is configured to be executed by a processor, to implement steps performed by the terminal according to the method for session reestablishment.

In the technical solutions of embodiments of the present disclosure, the SMF transmits a notification message about PDU session reestablishment to the terminal; the terminal transmits a NAS message to the AMF in accordance with the notification message, where the NAS message carries first identification information of the initial PDU session and second identification information assigned by the terminal to the new PDU session; the AMF transmits a session management request to the SMF corresponding to the first identification information, where the session management request carries the first identification information and the second identification information; and the SMF establishes the new PDU session in accordance with the first identification information and the second identification information. The embodiments of the present disclosure achieve the objective of connecting the new PDU session to the SMF selected for the initial PDU session by incorporating the first identification information and the second identification information into the NAS message and the session management request.

BRIEF DESCRIPTION OF THE DRAWINGS

FIG. 3 is a work flow diagram of a method for session reestablishment according to other embodiments of the present disclosure;

DETAILED DESCRIPTION

To describe the technical problem to be solved, the technical solutions and the advantages of the present disclosure more clearly, embodiments are described in detail hereinafter with reference to the accompanying drawings.

Embodiments of the present disclosure provide a method and an apparatus for session reestablishment, an AMF, an SMF and a terminal, so as to address the problem that the existing mechanism can not ensure that the AMF selects a same SMF for two PDU sessions to the same data network.

Figure 1:
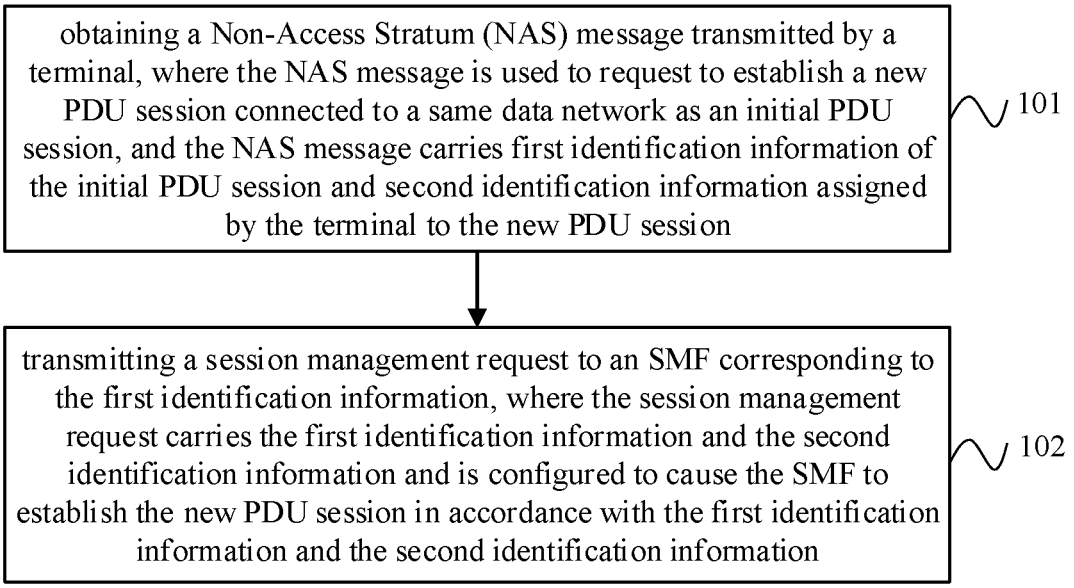
FIG. 1 is a work flow diagram of a method for session reestablishment according to some embodiments of the present disclosure.

As shown in FIG. 1, some embodiments of the present disclosure provide a method for session reestablishment, applied to an AMF, and including step 101 and step 102.

Step 101: obtaining a Non-Access Stratum (NAS) message transmitted by a terminal, where the NAS message is used to request to establish a new PDU session connected to a same data network as an initial PDU session, and the NAS message carries first identification information of the initial PDU session and second identification information assigned by the terminal to the new PDU session.

The NAS message is transmitted by the terminal after the notification message about PDU session reestablishment transmitted by the SMF is received by the terminal, the terminal establishes the new PDU session according to the notification message and assigns new session identification information, i.e., the second identification information, to the new PDU session. Here, the NAS message transmitted by the terminal to request to establish a new PDU session is different from the NAS message in the case of a common trigger event in SSC mode 3, and according to embodiments of the present disclosure, the NAS message transmitted by the terminal carries first identification information of the initial PDU session and second identification information assigned by the terminal to the new PDU session, such that the AMF is capable of selecting the initial SMF, i.e., the SMF corresponding to the first identification information, in accordance with the first identification information of the initial PDU session.

Step 102: transmitting a session management request to an SMF corresponding to the first identification information, where the session management request carries the first identification information and the second identification information and is configured to cause the SMF to establish the new PDU session in accordance with the first identification information and the second identification information.

In current 5G systems, the SMF selection is performed by the AMF. UE assigns PDU session IDs for respective PDU sessions. The NAS message transmitted by the UE to the AMF includes: Single-network slice selection assistance information (S-NSSAI), PDU Session ID, and N1 SM information. N1 SM information is the message transferred to the SMF via N1 interface, that is, the session management message transferred to the SMF. The NAS message has a specific format as follows: NAS Message (S-NSSAI, DNN, PDU Session ID, N1 SM information).

The PDU session establish request message currently defined includes the foregoing information. The AMF parses the S-NSSAI, DNN and PDU Session ID only and does not parse the N1 SM information. The S-NSSAI, DNN and PDU Session ID are used by the AMF for the SMF selection. Upon receipt of the NAS message, the AMF selects the SMF to which the NAS message to be routed according to the PDU session ID. If the PDU session was established before, the AMF would have saved the correlation between the PDU session ID and the SMF ID. Subsequently, after the AMF receives the Session Management NAS message (SM NAS message) associated with the PDU session ID, the AMF would transfer the SM NAS message directly to the SMF for processing. If the NAS message as initiated is about a request to establish a new PDU session, there is no SMF ID correlated with the PDU session ID in the NAS message. The SMF should select a new SMF ID for the PDU session according to information such as S-NSSAI and DNN, and save the correlation between the PDU session ID and the SMF ID.

In the embodiments of the present disclosure, the NAS message transmitted by the terminal to the AMF to request to establish the new PDU session carries first identification information of the initial PDU session and second identification information assigned by the terminal to the new PDU session. The AMF may select the SMF corresponding to the first identification information according to the NAS message, such that the new PDU session and the initial PDU session are connected to the same SMF.

Further, the step 102 may specifically include substep 1021 to substep 1023.

Substep 1021: parsing the NAS message to obtain the first identification information.

Here, the NAS message may specifically be a PDU session establishment request, the PDU session identification information of the PDU session establishment request carries the first identification information, and N1 session management message of the PDU session establishment request carries the second identification information. The AMF parses the PDU session identification information of the PDU session establishment request to obtain the first identification information.

Alternatively, the NAS message is a PDU session reestablishment request, and the PDU session identification information of the PDU session reestablishment request carries the first identification information and the second identification information. The AMF parses the PDU session identification information of the PDU session reestablishment request to obtain the first identification information and the second identification information.

According to embodiments of the present disclosure, the PDU session identification information of the PDU session establishment request may carry the first identification information, and N1 session management message of the PDU session establishment request may carry the second identification information, or the PDU session identification information of the redefined PDU session reestablishment request may carry both the first identification information and the second identification information, such that the AMF parses the AMF NAS message in the PDU session establishment request or the PDU session reestablishment request, to obtain the first identification information, thereby selecting, for the new PDU session, the SMF to which the initial PDU session is connected.

Substep 1022: obtaining SMF identification information corresponding to the first identification information in accordance with a pre-stored correspondence between identification information of PDU sessions and identification information of SMF s.

As known from the above description, the AMF saves the correlation between the PDU session IDs and the SMF IDs, and the AMF may select the SMF identification information corresponding to the initial PDU session according to the correlation, so as to transmit the session management request to the corresponding SMF subsequently, to enable the SMF to establish a new PDU session.

Substep 1023: transmitting the session management request to the SMF corresponding to the SMF identification information.

Here, the session management request is transmitted to the SMF corresponding to the SMF identification information, to ensure that the SMF transmitting the notification message to the terminal is the same as the SMF establishing the new PDU session. The SMF corresponding to the SMF identification information establishes the new PDU session in accordance with the first identification information and the second identification information.

Further, the method for session reestablishment according to embodiments of the present disclosure includes: obtaining the second identification information and identification information of the SMF transmitted by the SMF, and storing the second identification information and the SMF identification information in accordance with a correspondence between the second identification information and the SMF identification information.

Here, having established the new PDU session in accordance with the first identification information and the second identification information, the SMF transmits the second identification information and the identification information of the SMF to the AMF, so that the AMF may transmit the session management information associated with the second identification information to the SMF in accordance with the second identification information and the SMF identification information.

In the method for session reestablishment according to embodiments of the present disclosure, the AMF obtains a NAS message transmitted by the terminal, where the NAS message is used to request to establish a new PDU session connected to the same data network as an initial PDU session, and the NAS message carries first identification information of the initial PDU session and second identification information assigned by the terminal to the new PDU session; the AMF transmits a session management request to the SMF corresponding to the first identification information, where the session management request carries the first identification information and the second identification information and is configured to cause the SMF to establish the new PDU session in accordance with the first identification information and the second identification information, so as to achieve the objective of connecting the new PDU session and the initial PDU session to the same SMF, thus ensuring the session continuity effectively.

Figure 2:
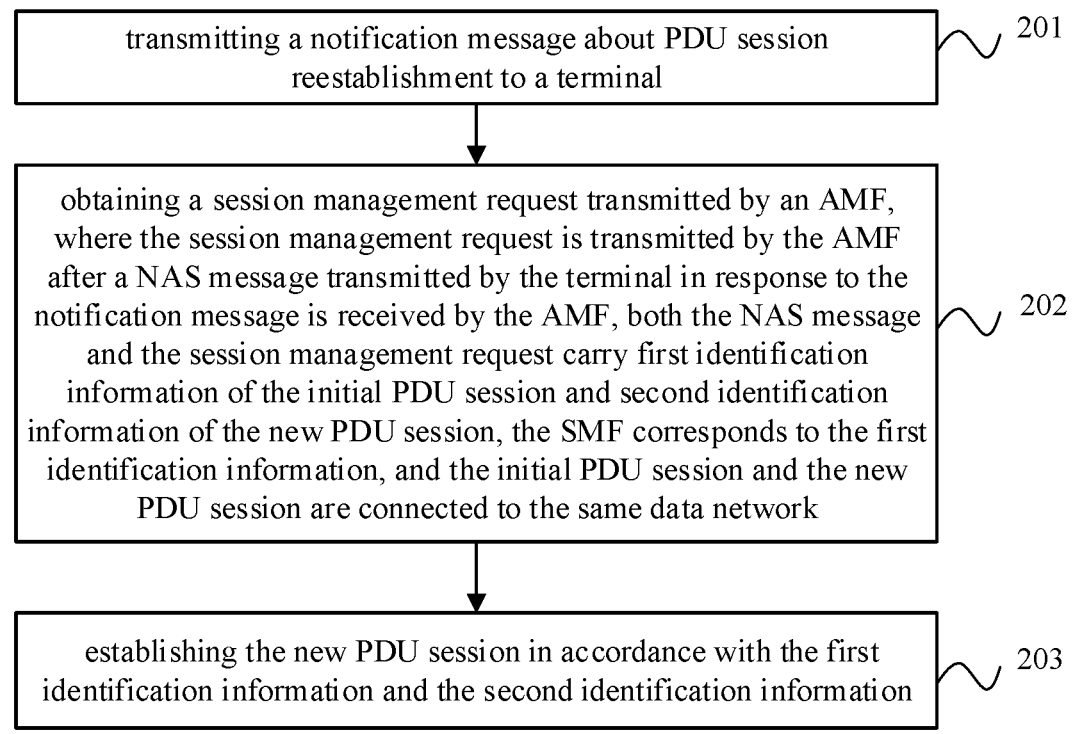
FIG. 2 is a work flow diagram of a method for session reestablishment according to other embodiments of the present disclosure.

As shown in FIG. 2, other embodiments of the present disclosure further provide a method for session reestablishment, applied to an SMF, and including step 201 to step 203.

Step 201: transmitting a notification message about PDU session reestablishment to a terminal.

The SMF determines a UPF in need of the session reestablishment service and transmits to the UE the notification message that the initial PDU session will be deleted in a period of time and the UE is required to establish a new PDU session to the same data network. The notification message includes identification information of the initial PDU session and a timer value specifying the time period during which the initial PDU session is to be preserved as expected by the network.

Step 202: obtaining a session management request transmitted by an AMF, where the session management request is transmitted by the AMF after a NAS message transmitted by the terminal in response to the notification message is received by the AMF, both the NAS message and the session management request carry first identification information of the initial PDU session and second identification information of the new PDU session, the SMF corresponds to the first identification information, and the initial PDU session and the new PDU session are connected to the same data network.

After receiving the NAS message transmitted by the terminal and carrying the first identification information and the second identification information, the AMF parses the NAS message to obtain the first identification information and transmits the session management request to the SMF corresponding to the first identification information, so that the new PDU session and the initial PDU session are connected to the same SMF.

Step 203: establishing the new PDU session in accordance with the first identification information and the second identification information.

Step 203 may include specifically sub step 2031 and sub step 2032.

Substep 2031: selecting a new UPF for the new PDU session in accordance with the first identification information and the second identification information.

The new UPF is different from the UPF corresponding to the initial PDU session. Since the session management request carries the first identification information and the second identification information, the SMF may select a new UPF different from the UPF corresponding to the first identification information in selecting a UPF for the new PDU session, thus effectively avoiding selecting the same UPF for the two sessions.

Substep 2032: establishing an N4 interface connection to the new UPF and establishing air interface and N3 User Plane connections for the new UPF.

Here, after the new PDU session has been established for a period of time, the network initiates the deletion of the initial PDU session, where the initial PDU session may be deleted by the UE, or may be deleted by the SMF after a timer is expired.

Further, subsequent to the establishing the new PDU session in accordance with the first identification information and the second identification information, the method further includes: establishing a correspondence between the second identification information and SMF identification information, and transmitting the second identification information and the SMF identification information to the AMF.

Here, after the SMF establishes the new PDU session in accordance with the first identification information and the second identification information, the SMF transmits the second identification information and the SMF identification information to the AMF, to facilitate the AMF to transmit the session management information associated with the second identification information to the SMF in accordance with the second identification information and the SMF identification information subsequently.

In the method for session reestablishment according to embodiments of the present disclosure, the SMF transmits a notification message about PDU session reestablishment to a terminal; obtains a session management request transmitted by an AMF; and establishes the new PDU session in accordance with the first identification information and the second identification information in the session management request, such that the new PDU session and the initial PDU session are connected to the same SMF, thereby ensuring the session continuity effectively.

As shown in FIG. 3, other embodiments of the present disclosure further provide a method for session reestablishment, applied to a terminal, and including the following steps.

Step 301: transmitting a NAS message to an AMF in accordance with a notification message about PDU session reestablishment transmitted by an SMF, where the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, where the session management request is configured to cause the SMF to establish the new PDU session in accordance with the first identification information and the second identification information.

The terminal establishes the new PDU session according to the notification message and assigns new session identification information, i.e., the second identification information, to the new PDU session. Here, the NAS message transmitted by the terminal to request to establish a new PDU session is different from the NAS message in the case of a common trigger event, and according to embodiments of the present disclosure, the NAS message transmitted by the terminal carries first identification information of the initial PDU session and second identification information assigned by the terminal to the new PDU session, such that the AMF is capable of selecting the initial SMF, i.e., the SMF corresponding to the first identification information, in accordance with the first identification information of the initial PDU session.

Further, the transmitting the NAS message to the AMF includes: adding the first identification information into PDU session identification information of a PDU session establishment request, adding the second identification information into N1 session management message of the PDU session establishment request and transmitting the PDU session establishment request to the AMF.

In the method for session reestablishment according to embodiments of the present disclosure, the terminal transmits the NAS message to the AMF in accordance with the notification message about PDU session reestablishment transmitted by the SMF; the AMF transmits a session management request carrying the first identification information of the initial PDU session and the second identification information of the new PDU session to the SMF in accordance with the NAS message transmitted by the terminal; and the SMF establishes the new PDU session in accordance with the first identification information and the second identification information. The embodiments of the present disclosure achieve the objective of connecting the new PDU session to the SMF selected for the initial PDU session by incorporating the first identification information and the second identification information into the NAS message and the session management request, thus ensuring the session continuity effectively.

Assuming the NAS message transmitted by the terminal according to the embodiments of the present disclosure is a PDU session establishment request, a session reestablishment implementation flow according to some embodiments of the present disclosure is illustrated hereinafter with reference to FIG. 4.

Figure 4:
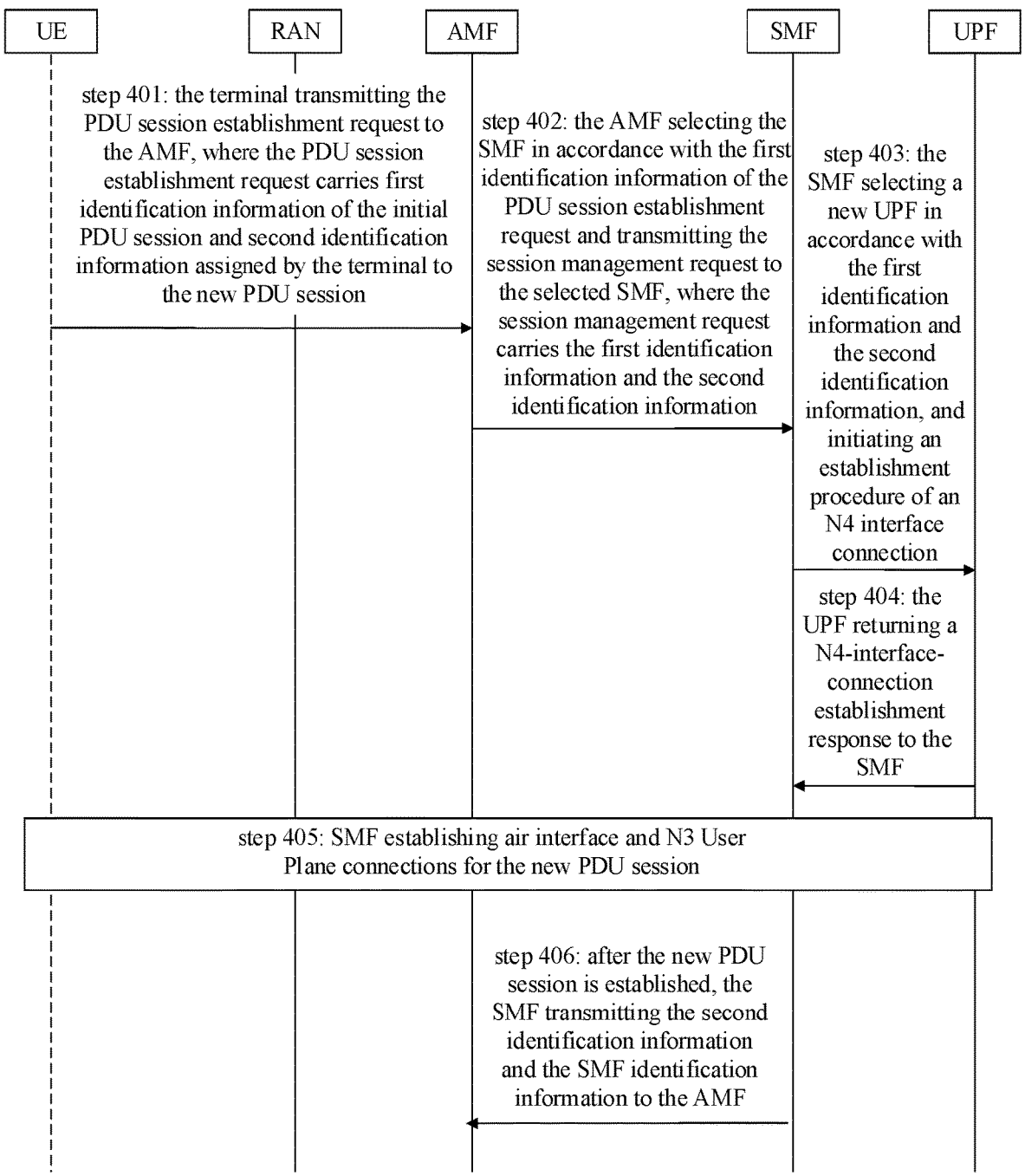
FIG. 4 is a flow diagram of interactions among a terminal, AMF, SMF and UPF in a method for session reestablishment according to some embodiments of the present disclosure.

As shown in FIG. 4, the implementation flow includes step 401 to step 406.

Step 401: the terminal transmitting the PDU session establishment request to the AMF, where the PDU session establishment request carries first identification information of the initial PDU session and second identification information assigned by the terminal to the new PDU session.

The PDU session establishment request is transmitted by the terminal to the AMF after the notification message about PDU session reestablishment transmitted by the SMF is received by the terminal. The PDU session establishment request has a specific format as follows: (PDU session ID1, N1 SM information (PDU session ID2)), where the PDU session ID1 is the first identification information of the initial session, and the PDU session ID2 is the second identification information of the new PDU session. The second identification information is included in the SM information and transparently transmitted to the SMF. The PDU session establishment request may also include S-NSSAI, DNN, etc.

Step 402: the AMF selecting the SMF in accordance with the first identification information of the PDU session establishment request and transmitting the session management request to the selected SMF, where the session management request carries the first identification information and the second identification information.

In specific, the AMF parses the PDU session identification information of the PDU session establishment request to obtain the first identification information; obtains SMF identification information corresponding to the first identification information in accordance with a pre-stored correspondence between identification information of PDU sessions and identification information of SMFs; and transmits the session management request to the SMF corresponding to the SMF identification information.

The session management request transmitted to the SMF may have a specific format as follows: (PDU session ID1, N1 SM information (PDU session ID2)).

Step 403: the SMF selecting a new UPF in accordance with the first identification information and the second identification information, and initiating an establishment procedure of an N4 interface connection.

Step 404: the UPF returning a N4-interface-connection establishment response to the SMF.

Step 405: the SMF establishing air interface and N3 User Plane connections for the new PDU session.

Step 406: after the new PDU session is established, the SMF transmitting the second identification information and the SMF identification information to the AMF.

The AMF stores the correspondence between the second identification information and the SMF identification information, and when a Session Management related message associated with the second identification information is received by the AMF later, the AMF routes the NAS message to the SMF.

In the method for session reestablishment according to embodiments of the present disclosure, when the UE is triggered by a network to establish a new SSC-mode-3 PDU session, the UE reuses the PDU session establishment request message. The PDU session ID in the message to be parsed by the AMF still carries the first identification information of the initial PDU session. The N1 SM information container carries the second identification information assigned by the UE to the new PDU session. The AMF transmits the session management request to the SMF corresponding to the first identification information, where the session management request carries the first identification information and the second identification information; and the SMF establishes the new PDU session in accordance with the first identification information and the second identification information, so as to achieve the objective of connecting the new PDU session to the SMF selected for the initial PDU session, thereby ensuring the session continuity effectively.

Figure 5:
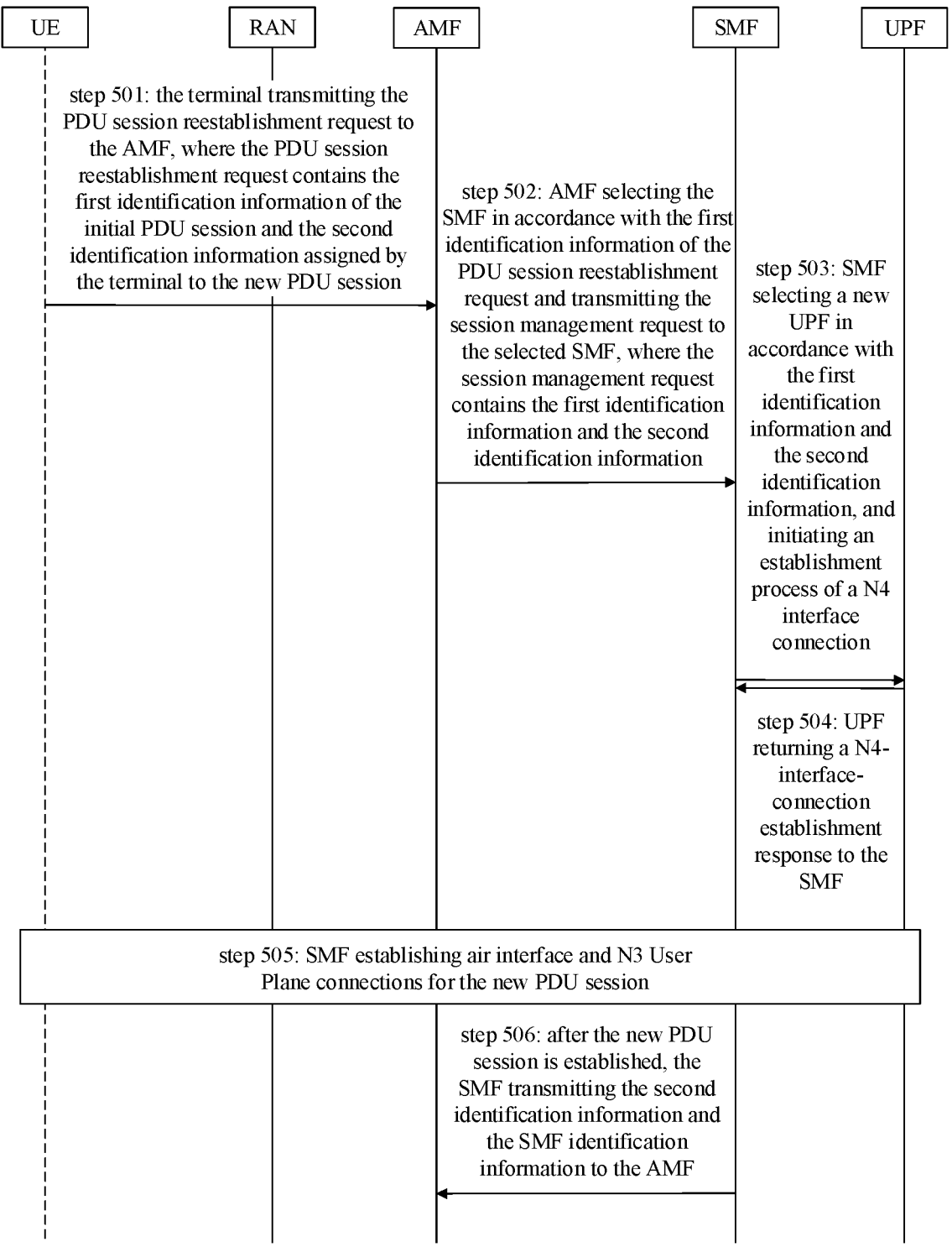
FIG. 5 is a flow diagram of interactions among a terminal, AMF, SMF and UPF in a method for session reestablishment according to other embodiments of the present disclosure.

Assuming the NAS message transmitted by the terminal according to the embodiments of the present disclosure is a redefined PDU session reestablishment request and the PDU session reestablishment request carries the first identification information of the initial PDU session and the second identification information assigned by the terminal to the new PDU session, a session reestablishment implementation flow according to other embodiments of the present disclosure is illustrated hereinafter with reference to FIG. 5.

As shown in FIG. 5, the implementation flow includes step 501 to step 506.

Step 501: the terminal transmitting the PDU session reestablishment request to the AMF, where the PDU session reestablishment request carries the first identification information of the initial PDU session and the second identification information assigned by the terminal to the new PDU session.

The PDU session reestablishment request is transmitted by the terminal to the AMF after the notification message about PDU session reestablishment transmitted by the SMF is received by the terminal. The PDU session reestablishment request has a specific format as follows: (PDU session ID1, PDU session ID2), where the PDU session ID1 is the first identification information of the initial session, and the PDU session ID2 is the second identification information of the new PDU session. The first identification information and the second identification information are included in the PDU session identification information of the PDU session reestablishment request.

Step 502: the AMF selecting the SMF in accordance with the first identification information of the PDU session reestablishment request and transmitting the session management request to the selected SMF, where the session management request carries the first identification information and the second identification information.

The session management request transmitted to the SMF may have a specific format as follows: (PDU session ID1, PDU session ID2).

Step 503: the SMF selecting a new UPF in accordance with the first identification information and the second identification information, and initiating an establishment procedure of an N4 interface connection.

Step 504: the UPF returning a N4-interface-connection establishment response to the SMF.

Step 505: the SMF establishing air interface and N3 User Plane connections for the new PDU session.

Step 506: after the new PDU session is established, the SMF transmitting the second identification information and the SMF identification information to the AMF.

The AMF stores the correspondence between the second identification information and the SMF identification information, and when a Session Management related message associated with the second identification information is received by the AMF later, the AMF routes the NAS message to the SMF.

In the method for session reestablishment according to embodiments of the present disclosure, a new NAS message is defined to initiate a new PDU session establishment request. In specific, the new NAS message is the PDU session reestablishment request, which carries the first identification information of the initial PDU session and the second identification information assigned to the new PDU session. The AMF transmits the session management request to the SMF corresponding to the first identification information, where the session management request carries the first identification information and the second identification information; and the SMF establishes the new PDU session in accordance with the first identification information and the second identification information, so as to achieve the objective of connecting the new PDU session to the SMF selected for the initial PDU session, thereby ensuring the session continuity effectively.

Figure 6:
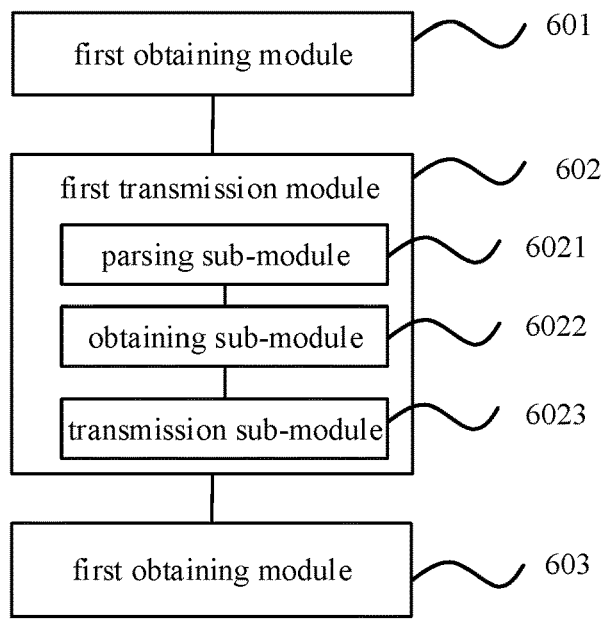
FIG. 6 is a structural block diagram of an apparatus for session reestablishment according to some embodiments of the present disclosure.

As shown in FIG. 6, some embodiments of the present disclosure further provide an apparatus for session reestablishment, applied to an AMF, and including the following modules: a first obtaining module 601, configured to obtain a NAS message transmitted by a terminal, where the NAS message is used to request to establish a new PDU session connected to a same data network as an initial PDU session, and the NAS message carries first identification information of the initial PDU session and second identification information assigned by the terminal to the new PDU session; and a first transmission module 602, configured to transmit a session management request to an SMF corresponding to the first identification information, where the session management request carries the first identification information and the second identification information, and is configured to cause the SMF to establish the new PDU session in accordance with the first identification information and the second identification information.

In the apparatus for session reestablishment according to embodiments of the present disclosure, the first transmission module 602 includes: a parsing sub-module 6021, configured to parse the NAS message to obtain the first identification information; an obtaining sub-module 6022, configured to obtain SMF identification information corresponding to the first identification information in accordance with a pre-stored correspondence between identification information of PDU sessions and identification information of SMFs; and a transmission sub-module 6023, configured to transmit the session management request to the SMF corresponding to the SMF identification information.

In the apparatus for session reestablishment according to embodiments of the present disclosure, the NAS message is a PDU session establishment request, the PDU session identification information of the PDU session establishment request carries the first identification information and N1 session management message of the PDU session establishment request carries the second identification information; and the parsing sub-module 6021 is configured to parse the PDU session identification information of the PDU session establishment request to obtain the first identification information.

In the apparatus for session reestablishment according to embodiments of the present disclosure, the NAS message is a PDU session reestablishment request, and the PDU session identification information of the PDU session reestablishment request carries the first identification information and the second identification information; and the parsing sub-module 6021 is configured to parse the PDU session identification information of the PDU session reestablishment request to obtain the first identification information and the second identification information.

The apparatus for session reestablishment according to embodiments of the present disclosure further includes: a second obtaining module 603, configured to obtain the second identification information and SMF identification information transmitted by the SMF, and store the second identification information and the SMF identification information in accordance with a correspondence between the second identification information and the SMF identification information.

It should be noted that, the apparatus for session reestablishment corresponds to the method in the above embodiments, and all implementations of the above method embodiments are applicable to the embodiments of the apparatus and may achieve the same technical effects.

The apparatus for session reestablishment according to embodiments of the present disclosure obtains a NAS message transmitted by the terminal, where the NAS message is used to request to establish a new PDU session connected to the same data network as an initial PDU session, and the NAS message carries first identification information of the initial PDU session and second identification information assigned by the terminal to the new PDU session; transmits a session management request to the SMF corresponding to the first identification information, where the session management request carries the first identification information and the second identification information and is configured to cause the SMF to establish the new PDU session in accordance with the first identification information and the second identification information, so as to achieve the objective of connecting the new PDU session and the initial PDU session to the same SMF, thus ensuring the session continuity effectively.

Figure 7:
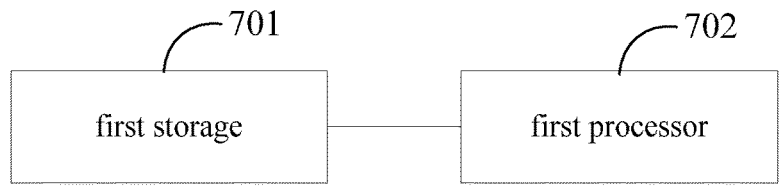
FIG. 7 is a structural block diagram of an AMF according to some embodiments of the present disclosure.

Further, as shown in FIG. 7, some embodiments of the present disclosure provide an Access and Mobility Management Function entity, including a first storage 701, a first processor 702 and a computer program that is stored on the first storage 701 and executable by the first processor 702, where the first processor is configured to execute the computer program to implement steps of the method for session reestablishment described in the first embodiment.

The first processor 702 is configured to call and execute the computer program stored in the first storage to implement the following functional modules: a first obtaining module, configured to obtain a NAS message transmitted by the terminal, where the NAS message is used to request to establish a new PDU session connected to a same data network as an initial PDU session, and the NAS message carries first identification information of the initial PDU session and second identification information assigned by the terminal to the new PDU session; and a first transmission module, configured to transmit a session management request to an SMF corresponding to the first identification information, where the session management request carries the first identification information and the second identification information and is configured to cause the SMF to establish the new PDU session in accordance with the first identification information and the second identification information.

The first processor 702 is configured to read a program in the first storage to implement the following process: obtaining a NAS message transmitted by a terminal, where the NAS message is used to request to establish a new PDU session connected to a same data network as an initial PDU session, and the NAS message carries first identification information of the initial PDU session and second identification information assigned by the terminal to the new PDU session; and transmitting a session management request to an SMF corresponding to the first identification information, where the session management request carries the first identification information and the second identification information and is configured to cause the SMF to establish the new PDU session in accordance with the first identification information and the second identification information.

Further, embodiments of the present disclosure provide a computer-readable storage medium storing therein a computer program, where the computer program is configured to be executed by a processor, to implement the following steps: obtaining a NAS message transmitted by a terminal, where the NAS message is used to request to establish a new PDU session connected to a same data network as an initial PDU session, and the NAS message carries first identification information of the initial PDU session and second identification information assigned by the terminal to the new PDU session; and transmitting a session management request to an SMF corresponding to the first identification information, where the session management request carries the first identification information and the second identification information and is configured to cause the SMF to establish the new PDU session in accordance with the first identification information and the second identification information.

The AMF according to embodiments of the present disclosure obtains a NAS message transmitted by the terminal, where the NAS message is used to request to establish a new PDU session connected to the same data network as an initial PDU session, and the NAS message carries first identification information of the initial PDU session and second identification information assigned by the terminal to the new PDU session; transmits a session management request to the SMF corresponding to the first identification information, where the session management request carries the first identification information and the second identification information and is configured to cause the SMF to establish the new PDU session in accordance with the first identification information and the second identification information, so as to achieve the objective of connecting the new PDU session and the initial PDU session to the same SMF, thus ensuring the session continuity effectively.

Figure 8:
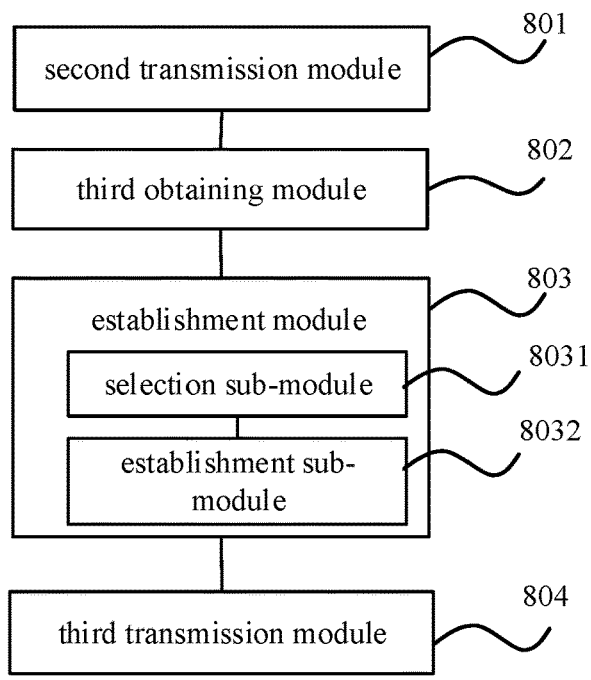
FIG. 8 is a structural block diagram of an apparatus for session reestablishment according to other embodiments of the present disclosure.

As shown in FIG. 8, other embodiments of the present disclosure provide an apparatus for session reestablishment, applied to an SMF, and including the following modules: a second transmission module 801, configured to transmit a notification message about PDU session reestablishment to a terminal; a third obtaining module 802, configured to obtain a session management request transmitted by an AMF, where the session management request is transmitted by the AMF after a NAS message transmitted by the terminal in response to the notification message is received by the AMF, both the NAS message and the session management request carry first identification information of an initial PDU session and second identification information of a new PDU session, the SMF corresponds to the first identification information, and the initial PDU session and the new PDU session are connected to a same data network; and an establishment module 803, configured to establish the new PDU session in accordance with the first identification information and the second identification information.

In the apparatus for session reestablishment according to embodiments of the present disclosure, the establishment module 803 includes: a selection sub-module 8031, configured to select a new UPF for the new PDU session in accordance with the first identification information and the second identification information; and an establishment sub-module 8032, configured to establish an N4 interface connection to the new UPF and establish air interface and N3 User Plane connections for the new UPF.

The apparatus for session reestablishment according to embodiments of the present disclosure further includes: a third transmission module 804, configured to establish a correspondence between the second identification information and SMF identification information, and transmit the second identification information and the SMF identification information to the AMF.

It should be noted that, the apparatus for session reestablishment corresponds to the method of the embodiment illustrated in FIG. 2, and all implementations of the embodiment illustrated in FIG. 2 are applicable to the embodiments of the apparatus and may achieve the same technical effects.

The apparatus for session reestablishment according to embodiments of the present disclosure transmits a notification message about PDU session reestablishment to a terminal; obtains a session management request transmitted by an AMF; and establishes the new PDU session in accordance with the first identification information and the second identification information in the session management request, so as to achieve the objective of connecting the new PDU session and the initial PDU session to the same SMF, thus ensuring the session continuity effectively.

Figure 9:
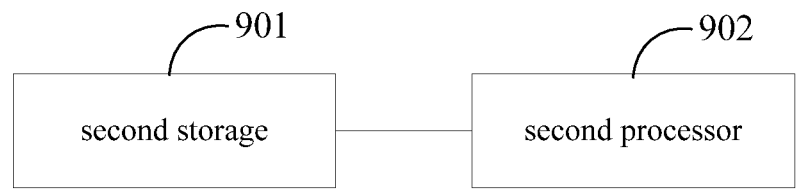
FIG. 9 is a structural block diagram of an SMF according to some embodiments of the present disclosure.

Further, as shown in FIG. 9, some embodiments of the present disclosure provide an SMF, including a second storage 901, a second processor 902 and a computer program that is stored on the second storage 901 and executable by the second processor 902, where the second processor 902 is configured to execute the computer program to implement steps of the method for session reestablishment described in the embodiment illustrated in FIG. 2.

The second processor 902 is configured to call and execute the computer program stored in the second storage to implement the following functional modules: a second transmission module, configured to transmit a notification message about PDU session reestablishment to a terminal; a third obtaining module, configured to obtain a session management request transmitted by an AMF, where the session management request is transmitted by the AMF after a NAS message transmitted by the terminal in response to the notification message is received by the AMF, both the NAS message and the session management request carry first identification information of an initial PDU session and second identification information of a new PDU session, the SMF corresponds to the first identification information, and the initial PDU session and the new PDU session are connected to a same data network; and an establishment module, configured to establish the new PDU session in accordance with the first identification information and the second identification information.

The second processor 902 is configured to read program in the second storage to implement the following process: transmitting a notification message about PDU session reestablishment to a terminal; obtaining a session management request transmitted by an AMF, where the session management request is transmitted by the AMF after a NAS message transmitted by the terminal in response to the notification message is received by the AMF, both the NAS message and the session management request carry first identification information of an initial PDU session and second identification information of a new PDU session, the SMF corresponds to the first identification information, and the initial PDU session and the new PDU session are connected to a same data network; and establishing the new PDU session in accordance with the first identification information and the second identification information.

Further, some embodiments of the present disclosure provide a computer-readable storage medium storing therein a computer program, where the computer program is configured to be executed by a processor, to implement the following steps: transmitting a notification message about PDU session reestablishment to a terminal; obtaining a session management request transmitted by an AMF, where the session management request is transmitted by the AMF after a NAS message transmitted by the terminal in response to the notification message is received by the AMF, both the NAS message and the session management request carry first identification information of an initial PDU session and second identification information of a new PDU session, the SMF corresponds to the first identification information, and the initial PDU session and the new PDU session are connected to a same data network; and establishing the new PDU session in accordance with the first identification information and the second identification information.

The SMF according to embodiments of the present disclosure transmits a notification message about PDU session reestablishment to a terminal; obtains a session management request transmitted by an AMF; and establishes the new PDU session in accordance with the first identification information and the second identification information in the session management request, so as to achieve the objective of connecting the new PDU session and the initial PDU session to the same SMF, thus ensuring the session continuity effectively.

Figure 10:
FIG. 10 is a structural block diagram of an apparatus for session reestablishment according to other embodiments of the present disclosure.

As shown in FIG. 10, other embodiments of the present disclosure further provide an apparatus for session reestablishment, applied to a terminal, and including: a fourth transmission module 1001, configured to transmit a NAS message to an AMF in accordance with a notification message about PDU session reestablishment transmitted by an SMF, where the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, where the session management request is configured to cause the SMF to establish the new PDU session in accordance with the first identification information and the second identification information.

In the apparatus for session reestablishment according to embodiments of the present disclosure, the fourth transmission module is configured to add the first identification information into PDU session identification information of a PDU session establishment request, add the second identification information into N1 session management message of the PDU session establishment request and transmit the PDU session establishment request to the AMF.

It should be noted that, the terminal corresponds to the method of the embodiment illustrated in FIG. 3, and all implementations of the embodiment illustrated in FIG. 3 are applicable to the embodiments of the terminal and may achieve the same technical effects.

The terminal according to embodiments of the present disclosure transmits a NAS message to an AMF in accordance with a notification message about PDU session reestablishment transmitted by an SMF; the AMF transmits a session management request carrying the first identification information of the initial PDU session and the second identification information of the new PDU session to the SMF in accordance with the NAS message transmitted by the terminal; and the SMF establishes the new PDU session in accordance with the first identification information and the second identification information. The embodiments of the present disclosure achieve the objective of connecting the new PDU session to the SMF selected for the initial PDU session by incorporating the first identification information and the second identification information into the NAS message and the session management request, thus ensuring the session continuity effectively.

Figure 11:
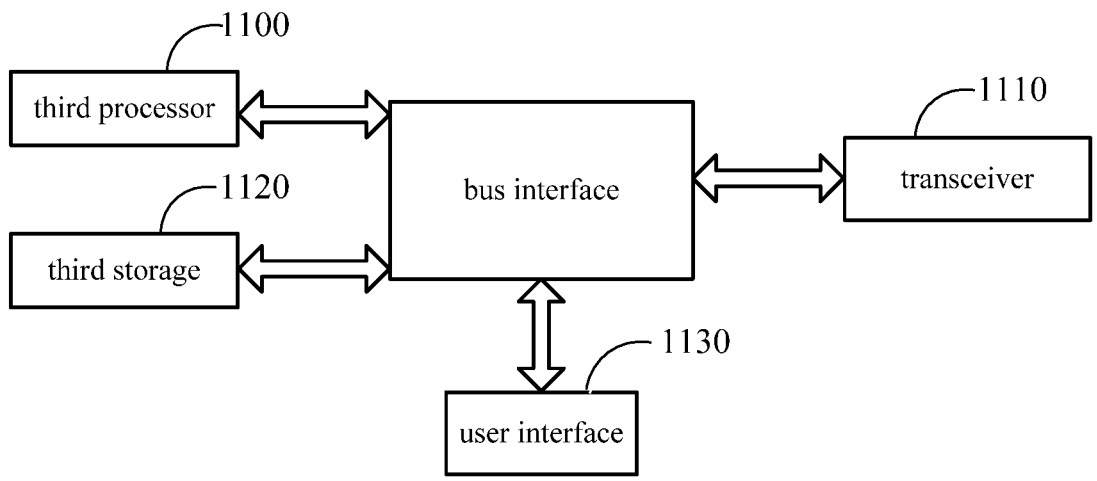
FIG. 11 is a structural block diagram of a terminal according to some embodiments of the present disclosure.

In order to better achieve the aforementioned objective, as shown in FIG. 11, some embodiments of the present disclosure further provide a terminal, including: a third processor 1100, a third storage 1120 connected to the third processor 1100 via a bus interface, a computer program stored on the third storage 1120 and configured to be executed by the third processor 1100, and a transceiver 1110 connected to the third processor 1100 via a bus interface; where the third storage is configured to store programs and data being used by the third processor in operation, downlink control channel is received through the transceiver 1110, and the third processor is configured to call and execute the programs and data stored in the third storage 1120 to implement the following functional module.

A fourth transmission module, configured to transmit a NAS message to an AMF in accordance with a notification message about PDU session reestablishment transmitted by an SMF, where the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, where the session management request is configured to cause the SMF to establish the new PDU session in accordance with the first identification information and the second identification information.

The third processor 1100 is configured to read program in the third storage 1120 to implement the following process: transmitting, via the transceiver 1110, a NAS message to an AMF in accordance with a notification message about PDU session reestablishment transmitted by an SMF, where the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, where the session management request is configured to cause the SMF to establish the new PDU session in accordance with the first identification information and the second identification information.

The transceiver 1110 is configured to receive and transmit data under the control of the third processor 1100.

In FIG. 11, the bus architecture may include any number of interconnected buses and bridges, to connect various circuits to each other, such as one or more processors represented by the third processor 1100 and storages represented by the third storage 1120. The bus architecture may also connect various other circuits such as peripherals, voltage regulators and power management circuits, which is well known in the art. Therefore, a detailed description thereof is omitted herein. The bus interface provides an interface. The transceiver 1110 may include plural elements, i.e., a receiver and a transmitter, to allow for communication with various other apparatuses on the transmission medium. Depending on the User Equipment, user interface 1130 may also be an interface connected internally or externally to necessary devices, the connected devices including, but not limited to: keypad, display, speaker, microphone, joystick, etc.

The third processor 1100 is responsible for the management of the bus architecture and regular operations, and the third storage 1120 may store data used by the third processor 1100 while in operation.

Further, some embodiments of the present disclosure provide a computer-readable storage medium storing therein a computer program, where the computer program is configured to be executed by a processor, to implement the following steps: transmitting a NAS message to an AMF in accordance with a notification message about PDU session reestablishment transmitted by an SMF, where the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, where the session management request is configured to cause the SMF to establish the new PDU session in accordance with the first identification information and the second identification information.

In the terminal according to embodiments of the present disclosure, the third processor 1100 is configured to transmit a NAS message to the AMF in accordance with the notification message about PDU session reestablishment transmitted by an SMF; the AMF transmits a session management request carrying the first identification information of the initial PDU session and the second identification information of the new PDU session to the SMF in accordance with the NAS message transmitted by the terminal; and the SMF establishes the new PDU session in accordance with the first identification information and the second identification information. The embodiments of the present disclosure achieve the objective of connecting the new PDU session to the SMF selected for the initial PDU session by incorporating the first identification information and the second identification information into the NAS message and the session management request, thus ensuring the session continuity effectively.

The above descriptions are merely preferred embodiments of the present disclosure, and the scope of the present disclosure is not limited thereto. Any modifications, equivalent replacements or improvements made without departing from the spirit and principle of the disclosure shall fall within the scope of the present disclosure.

What is claimed is:
1. A method for session reestablishment, applied to an Access and Mobility Management Function entity AMF, and comprising:
    obtaining a Non-Access Stratum NAS message transmitted by a terminal, wherein the NAS message is used to request to establish a new packet data unit PDU session connected to a same data network as an initial PDU session, and the NAS message carries first identification information of the initial PDU session and second identification information of the new PDU session assigned by the terminal; and
    transmitting a session management request to a Session Management Function entity SMF corresponding to the first identification information, wherein the session management request carries the first identification information and the second identification information, and the session management request is configured to cause the SMF to establish the new PDU session in accordance with the first identification information and the second identification information.

2. The method for session reestablishment according to claim 1, wherein the transmitting the session management request to the SMF corresponding to the first identification information comprises:
    parsing the NAS message to obtain the first identification information;
    obtaining SMF identification information corresponding to the first identification information in accordance with a pre-stored correspondence between identification information of PDU sessions and identification information of SMFs; and transmitting the session management request to the SMF corresponding to the SMF identification information.

3. The method for session reestablishment according to claim 2, wherein the NAS message is used to initiate a PDU session establishment request, PDU session identification information in the PDU session establishment request carries the first identification information, and N1 session management message in the PDU session establishment request carries the second identification information; and the parsing the NAS message to obtain the first identification information comprises:

parsing the PDU session identification information in the PDU session establishment request to obtain the first identification information.

4. The method for session reestablishment according to claim 2, wherein the NAS message is used to initiate a PDU session reestablishment request, and PDU session identification information in the PDU session reestablishment request carries the first identification information and the second identification information; and the parsing the NAS message to obtain the first identification information comprises:

parsing the PDU session identification information in the PDU session reestablishment request to obtain the first identification information and the second identification information.

5. The method for session reestablishment according to claim 1, further comprising:

obtaining the second identification information and identification information of the SMF transmitted by the SMF, and storing the second identification information and the identification information of the SMF according to a correspondence between identification information of PDU sessions and identification information of SMFs.

6. An apparatus for session reestablishment, applied to an Access and Mobility Management Function entity AMF, and comprising:

a first storage, a first processor and a program that is stored on the first storage and executable by the first processor, wherein the first processor is configured to execute the program to implement steps of the method for session reestablishment according to claim 1.

7. The apparatus for session reestablishment according to claim 6, wherein the first processor is configured to:

parse the NAS message to obtain the first identification information;

obtain SMF identification information corresponding to the first identification information in accordance with a pre-stored correspondence between identification information of PDU sessions and identification information of SMFs; and transmit the session management request to the SMF corresponding to the SMF identification information.

8. The apparatus for session reestablishment according to claim 7, wherein the NAS message is used to initiate a PDU session establishment request, PDU session identification information in the PDU session establishment request carries the first identification information, and N1 session management message in the PDU session establishment request carries the second identification information; and the first processor is configured to parse the PDU session identification information in the PDU session establishment request to obtain the first identification information.

9. The apparatus for session reestablishment according to claim 7, wherein the NAS message is used to initiate a PDU session reestablishment request, and PDU session identification information in the PDU session reestablishment request carries the first identification information and the second identification information; and the first processor is configured to parse the PDU session identification information in the PDU session reestablishment request to obtain the first identification information and the second identification information.

10. The apparatus for session reestablishment according to claim 6, wherein the first processor is further configured to:

obtain the second identification information and identification information of the SMF transmitted by the SMF, and storing the second identification information and the identification information of the SMF according to a correspondence between identification information of PDU sessions and identification information of SMFs.

11. A method for session reestablishment, applied to a Session Management Function entity SMF, and comprising:

transmitting a notification message about PDU session reestablishment to a terminal;

obtaining a session management request transmitted by an Access and Mobility Management Function entity AMF, wherein the session management request is transmitted by the AMF after a Non-Access Stratum NAS message transmitted by the terminal in response to the notification message is received by the AMF, each of the NAS message and the session management request carries first identification information of an initial PDU session and second identification information of a new PDU session, the SMF corresponds to the first identification information, and the initial PDU session and the new PDU session are connected to a same data network; and establishing the new PDU session in accordance with the first identification information and the second identification information.

12. The method for session reestablishment according to claim 11, wherein the establishing the new PDU session in accordance with the first identification information and the second identification information comprises:

selecting a new anchor User Plane Function UPF for the new PDU session in accordance with the first identification information and the second identification information; and establishing an N4 interface connection to the new UPF and establishing air interface and N3 User Plane connections for the new UPF.

13. The method for session reestablishment according to claim 11, wherein after establishing the new PDU session in accordance with the first identification information and the second identification information, the method further comprises:

establishing a correspondence between the second identification information and identification information of the SMF, and transmitting the second identification information and the identification information of the SMF to the AMF.

14. An apparatus for session reestablishment, applied to a Session Management Function entity SMF, and comprising:

a second storage, a second processor and a program that is stored on the second storage and executable by the second processor, wherein the second processor is configured to execute the program to implement steps of the method for session reestablishment according to claim 11.

15. The apparatus for session reestablishment according to claim 14, wherein the second processor is configured to:
select a new anchor User Plane Function UPF for the new PDU session in accordance with the first identification information and the second identification information; and
establish an N4 interface connection to the new UPF and establish air interface and N3 User Plane connections for the new UPF.

16. The apparatus for session reestablishment according to claim 14, wherein the second processor is further configured to:
establish a correspondence between the second identification information and identification information of the SMF, and transmit the second identification information and the identification information of the SMF to the AMF.

17. A method for session reestablishment, applied to a terminal, and comprising:
transmitting a Non-Access Stratum NAS message to an Access and Mobility Management Function entity AMF in accordance with a notification message about PDU session reestablishment transmitted by a Session Management Function entity SMF, wherein the NAS message is used to request to establish a new PDU session connected to a same data network as an initial PDU session, the NAS message carries first identification information of the initial PDU session and second identification information of the new PDU session, and the NAS message is used to cause the AMF to transmit a session management request carrying the first identification information and the second identification information to the SMF corresponding to the first identification information, wherein the session management request is configured to cause the SMF to establish the new PDU session in accordance with the first identification information and the second identification information.

18. The method for session reestablishment according to claim 17, wherein the transmitting the NAS message to the AMF comprises:
adding the first identification information into PDU session identification information of a PDU session establishment request, adding the second identification information into N1 session management message of the PDU session establishment request and transmitting the PDU session establishment request to the AMF.

19. An apparatus for session reestablishment, applied to a terminal, and comprising:
a third storage, a third processor and a program that is stored on the third storage and executable by the third processor, wherein the third processor is configured to execute the program to implement steps of the method for session reestablishment according to claim 17.

20. The apparatus for session reestablishment according to claim 19, wherein the third processor is configured to add the first identification information into PDU session identification information of a PDU session establishment request, add the second identification information into N1 session management message of the PDU session establishment request and transmit the PDU session establishment request to the AMF.

* * * * *